(12) United States Patent
Komori et al.

(10) Patent No.: US 6,602,564 B1
(45) Date of Patent: Aug. 5, 2003

(54) VAPOR DEPOSITION FILM AND PACKAGING MATERIAL

(75) Inventors: Tsunenori Komori, Tokyo (JP); Mamoru Sekiguchi, Tokyo (JP); Noboru Sasaki, Tokyo (JP); Ken Shimatani, Tokyo (JP); Fumitake Koizumi, Tokyo (JP)

(73) Assignee: Toppan Printing Co., Ltd., Tokyo (JP)

( * ) Notice: Subject to any disclaimer, the term of this patent is extended or adjusted under 35 U.S.C. 154(b) by 0 days.

(21) Appl. No.: 09/763,030

(22) PCT Filed: Feb. 24, 1999

(86) PCT No.: PCT/JP99/00848

§ 371 (c)(1),
(2), (4) Date: Apr. 19, 2001

(87) PCT Pub. No.: WO00/10803

PCT Pub. Date: Feb. 3, 2000

(30) Foreign Application Priority Data

Aug. 21, 1998 (JP) .............................. 10-235611

(51) Int. Cl.[7] .............................. B32B 7/10; B65D 30/08
(52) U.S. Cl. .................. 428/34.9; 428/35.4; 428/36.7; 428/213; 428/215; 428/216; 428/387; 428/447; 428/448; 428/451; 428/500
(58) Field of Search ............... 428/34.9, 35.4, 428/36.7, 213, 215, 216, 387, 447, 448, 451, 500

(56) References Cited

U.S. PATENT DOCUMENTS 3,442,686 A * 5/1969 Jones .......................... 117/70
5,942,320 A * 8/1999 Miyake et al. .............. 428/216

FOREIGN PATENT DOCUMENTS

JP 04076084 A * 3/1992

OTHER PUBLICATIONS

Abstract of Japanese Patent No. 10–264292, filed Oct. 6, 1998.
Abstract of Japanese Patent No. 10–156996, filed Jun. 16, 1998.
Abstract of Japanese Patent No. 10000725, Jan. 6, 1998.
Abstract of Japanese Patent No. 10000722, Jan. 6, 1998.
Abstract of Japanese Patent No. 9–314725, Dec. 9, 1997.
Abstract of Japanese Patent No. 9–123333, May 13, 1997.
Abstract of Japanese Patent No. 10–128936, May 19, 1998.

* cited by examiner

Primary Examiner—Sandra M. Nolan
(74) Attorney, Agent, or Firm—Staas & Halsey LLP

(57) ABSTRACT

A vapor deposition film comprises a substrate made of a plastic material, a primer layer made from a composition comprising a specific trifunctional organosilane or a hydrolysate of the organosilane, an acryl polyol and an isocyanate compound, and an inorganic oxide vapor deposition layer to a thickness of 5~300 nm, formed by successive lamination on at least one side of the substrate. Also, packaging materials and packages which employ the film are provided.

29 Claims, 2 Drawing Sheets

VAPOR DEPOSITION FILM AND PACKAGING MATERIAL

This application claims 35 USC 371 priority from PCT/JP99/00848, filed Feb. 24, 1999 and 35 USC 119 priority from Japanese application 10/235611, filed Aug. 21, 1998.

TECHNICAL FIELD

The present invention relates to a vapor deposition film with excellent adhesion of a vapor deposition layer and to a packaging material using the same, and more specifically relates to packaging materials used for packaging in the fields of foods, non-foods, medicines and so forth, as well as a vapor deposition film used for such packaging materials, and particularly to packaging materials used in packaging fields which require boiling sterilization, retort sterilization, autoclave sterilization and the like, and to a vapor deposition film used for such packaging materials.

BACKGROUND ART

In recent years packaging materials used for packaging of foods, non-foods, medicines, etc. must have the ability to block the effects of oxygen, water vapor and other gases which permeate the packaging materials and alter the quality of their contents, in order to prevent such alteration in the contents and maintain their functions and properties. Hence there is a demand for packaging materials with gas barrier properties which block these gases. Commonly used packaging materials to date have therefore employed metal foils of aluminum, etc. as gas barrier layers, because they are largely unaffected by temperature and humidity.

Nevertheless, while packaging materials employing aluminum and other metal foils have excellent gas barrier properties, problems have existed because of their drawbacks, which include the fact that such packaging materials are not transparent enough to allow visual verification of their contents, that they must be treated as non-combustibles when disposed of after use, and that metal detectors cannot be used for their examination.

As packaging materials designed to overcome these drawbacks there have been developed films wherein silicon oxide, aluminum oxide, magnesium oxide or another inorganic oxide vapor deposition film has formed on a polymer film by a forming means such as vacuum vapor deposition or sputtering, as is described, for example, in U.S. Pat. No. 3,442,686, Japanese Examined Patent Publication No. Sho 63-28017, etc. Such vapor deposition films are known to be transparent with gas barrier properties against oxygen, water vapor and the like, and are thus suitable as packaging materials which provide both the transparency and gas barrier properties which are unobtainable with metal foils, etc.

However, although such films are suitable for the packaging materials described above, virtually none of them can be used as vapor deposition films alone for packaging containers and packaging materials. This is because packages are completed by undergoing post-processing after vapor deposition, which involves various steps such as printing of characters and images on the vapor deposition film surface, or attachment to other films, etc. and shaping into packages for containers and the like. In particular, because packaging materials subjected to boiling sterilization, retort sterilization or autoclave sterilization are sterilized through many different steps, due care must be taken in designing such packaging materials.

When attempts have been made to use these types of vapor deposition films in combination with sealant films to prepare bags which are then filled with contents and subjected to boiling sterilization or retort sterilization, peeling of the vapor deposition layer has occurred at parts of the sealed sections resulting in a poor outer appearance, while the gas barrier properties are also reduced at those sections, leading to alteration in the quality of the contents.

In other words, the conditions for packaging materials in such situations include transparency which allows the contents to be directly viewed, high gas barrier properties to block gases which adversely affect the contents, and resistance to sterilization treatment with no deterioration of the gas barrier properties and no peeling after boiling sterilization, retort sterilization and autoclave sterilization; at present, however, no packaging materials have been discovered which satisfy all of these conditions. The conventional packaging materials have also had the problem of deteriorating water resistance, and especially poorer laminate strength after exposure to water.

SUMMARY OF THE INVENTION

It is a first object of the present invention to provide a vapor deposition film which allows direct viewing of contents and which has high gas barrier properties comparable to those of aluminum foil. In particular, there is provided a vapor deposition film which exhibits no peeling of the vapor deposition layer from the substrate or deterioration of its gas barrier properties even after boiling sterilization or retort sterilization, and without loss of laminate strength after exposure to water, thus promising a wide range of possible uses in packaging materials with general usefulness for foods, non-foods, medicines and the like.

It is a second object of the invention to provide a packaging material made using this vapor deposition film, which is a highly practical packaging material with high gas barrier properties and with high resistance to sterilization, undergoing no loss of its properties and no peeling of the vapor deposition layer from the substrate even after boiling sterilization or retort sterilization.

It is a third object of the invention to provide bag-like packages made using the packaging material, which are packages which undergo no deterioration in oxygen permeability or laminate strength after sterilization treatment, and which exhibit virtually no peeling of their vapor deposition layers from their substrates.

In order to achieve the objects described above, the present invention provides a vapor deposition film comprising a substrate made of a transparent plastic material, a primer layer comprising a composition which contains a trifunctional organosilane represented by the general formula $R'Si(OR)_3$ (wherein R' is a substituted or unsubstituted alkyl group, vinyl group, etc. and R is an alkyl group, etc.) or a hydrolysate of the organosilane, an acryl polyol and an isocyanate compound, and a vapor deposition layer comprising an inorganic oxide in a thickness of 5~300 nm, formed by successive lamination on at least one side of the substrate.

The present invention further provides the aforementioned vapor deposition film wherein R' in the trifunctional organosilane is an alkyl group including an epoxy group or isocyanate group.

A reaction catalyst is preferably added to the aforementioned composition for the primer layer. In particular, the reaction catalyst may be a tin compound, and is preferably a tin compound selected from the group consisting of tin chloride, tin oxychloride and tin alkoxides.

It is preferred to further add to the composition a metal alkoxide represented by the general formula $M(OR)_n$ (wherein M is a metal element, R is an alkyl group such as $CH_3$, $C_2H_5$, etc. and n is the oxidation number of the metal element) or a hydrolysate of the metal alkoxide. Here, the metal of the metal alkoxide is preferably a metal selected from the group consisting of Si, Al, Ti, Zr and their mixtures.

The thickness of the primer layer is preferred to be in the range of 0.01~2 μm.

The inorganic oxide of the vapor deposition layer is preferably one selected from the group consisting of aluminum oxide, silicon oxide, magnesium oxide and their mixtures.

An overcoating layer may be also laminated on the vapor deposition layer, and it is preferred for the overcoating layer to be a layer obtained by applying, heating and drying a coating agent composed mainly of an aqueous solution or an aqueous/alcohol mixed solution containing a water-soluble polymer and either or both (a) at least one metal alkoxide or hydrolysate thereof and (b) tin chloride. Here, the metal alkoxide is preferably one selected from the group consisting of tetraethoxysilane, triisopropoxyaluminum and mixtures thereof. The water-soluble polymer is preferably polyvinyl alcohol.

The invention still further provides a packaging material prepared by laminating the aforementioned vapor deposition film and a heat seal layer on the vapor deposition layer or the overcoating layer side.

The invention still further provides packages made into bag form using the aforementioned packaging material.

BRIEF DESCRIPTION OF THE DRAWINGS

The present invention will now be explained in greater detail with reference to the drawings in which.

DETAILED DESCRIPTION OF THE PREFERRED EMBODIMENTS

Figure 1:
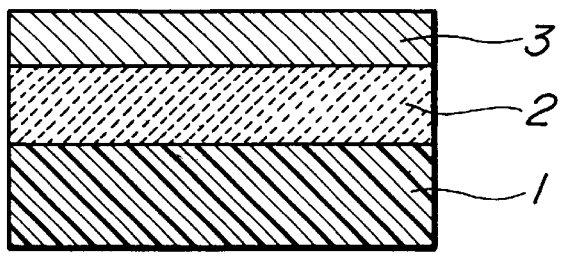
FIG. 1 is a partial cross-sectional view of a vapor deposition film according to an embodiment of the present invention.
Figure 2:
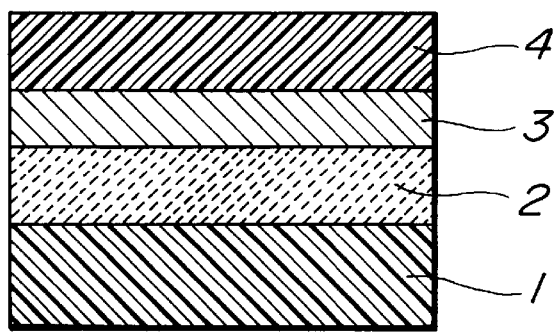
FIG. 2 is a partial cross-sectional view of a vapor deposition film according to another embodiment of the present invention.

FIG. 1 and FIG. 2 are cross-sectional views of vapor deposition films according to embodiments of the present invention.

In FIG. 1, the substrate 1 is a film made of a plastic material. On the substrate 1 there are successively laminated a primer layer 2 made of a composition comprising a trifunctional organosilane, an acryl polyol and an isocyanate compound, and a vapor deposition layer 3 containing an inorganic oxide. In FIG. 2, an overcoating layer 4 is further laminated thereon.

The substrate 1 is a plastic material, and a transparent film is preferred to take advantage of the transparency of the vapor deposition layer. As examples of substrates there may be mentioned polyester films such as polyethylene terephthalate (PET) and polyethylene naphthalate; polyolefin films such as polyethylene and polypropylene; polystyrene films; polyamide films; polyvinyl chloride films; polycarbonate films; polyacrylonitrile films; and polyimide films. The substrate may be stretched or unstretched, and should have certain mechanical strength and dimensional stability. Particularly preferred among these are polyethylene terephthalate films optionally stretched in biaxial directions. An opposite side of the substrate to the side thereof on which the vapor deposition layer is formed may also be coated with thin-films formed from any of various well known additives and stabilizers, including antistatic agents, ultraviolet inhibitors, plasticizers, lubricants and the like. For better adhesion with these thin-films, the coated side of the substrate may be subjected to any type of pretreatment, such as corona treatment, low-temperature plasma treatment, ion bombardment treatment, chemical treatment, solvent treatment, etc.

The thickness of the substrate is not under any particular restrictions, and from the standpoint of suitability as packaging materials, the film may be laminated with a film of a different nature than the film itself. From the standpoint of workability when forming the primer layer and inorganic oxide vapor deposition layer, as well as the overcoating layer, a practical range of 3~200 μm is preferred, with 6~30 μm being particularly preferred.

From a productivity standpoint, a long, continuous film is preferred which allows continuous formation of each of the aforementioned layers.

The primer layer according to the present invention is formed on the substrate made of a plastic material, and this layer serves to increase the adhesion between the substrate and the inorganic oxide vapor deposition layer, and to prevent peeling of the vapor deposition layer after boiling sterilization, retort sterilization or autoclave sterilization.

As a result of much diligent research, the present inventors have found that compositions of trifunctional organosilanes or their hydrolysates with acryl polyol and isocyanate compounds can be used as the primer layer in order to achieve the aforementioned object of the present invention.

The composition of the primer layer will now be explained in detail.

The trifunctional organosilane used according to the present invention is a compound represented by the general formula $R'Si(OR)_3$ (wherein R' is a substituted or unsubstituted alkyl group, vinyl group, etc. and R is an alkyl group, etc.). Here, the substituent of R' preferably includes an epoxy group or isocyanate group. As specific exemplary compounds there may be mentioned ethyltrimethoxysilane and vinyltrimethoxysilane; glycidoxy propyltrimethoxysilane, glycidoxy trimethoxysilane and epoxycyclohexylethyl trimethoxysilane where R' includes an epoxy group; and γ-isocyanate propyltrimethoxysilane and γ-isocyanate propyltriethoxysilane where R' includes an isocyanate group. These compounds may be used alone or in combinations of two or more.

The trifunctional organosilane used according to the present invention may also be a hydrolysate of the compound represented by the general formula $R'Si(OR)_3$ (where R' is a substituted or unsubstituted alkyl group, vinyl group, etc. and R is an alkyl group, etc.). Here, the substituent of R' preferably includes an epoxy group. The same specific exemplary compounds given above apply.

The process used to obtain hydrolysates of these compounds can be a known process involving direct addition of an acid or alkali to the trifunctional organosilane.

The acryl polyol used according to the present invention is a polymer compound obtained by polymerizing an acrylic acid derivative monomer or a copolymer compound obtained by copolymerizing an acrylic acid derivative monomer and another monomer, the (co)polymer compound also having a terminal hydroxyl group so as to react with the isocyanate group of the isocyanate compound which is subsequently added. Among such compounds it is preferred to use acryl polyols obtained by simple polymerization of acrylic acid derivative monomers such as ethyl (meth) acrylate, hydroxyethyl (meth)acrylate, hydroxypropyl (meth)acrylate and hydroxybutyl (meth)acrylate, or obtained by copolymerization through addition of another monomer such as styrene. From the standpoint of reactivity with the isocyanate compound, it is preferred for the hydroxy value to be between 5 and 200 (KOHmg/g).

The mixing ratio of the acryl polyol and the trifunctional organosilane is preferably in the range of 1/1 to 100/1, and more preferably in the range of 2/1 to 50/1, in terms of weight ratio.

No catalyst is necessary when combining the acryl polyol with the trifunctional organosilane when R' in the aforementioned general formula includes an isocyanate group. Addition of a reaction catalyst is preferred, however, when combining the acryl polyol with a trifunctional organosilane other than a trifunctional organosilane with an isocyanate group, in order to promote the reaction. From the standpoint of reactivity and polymerization stability, the catalyst added is preferably a tin compound such as tin chloride ($SnCl_2$, $SnCl_4$), tin oxychloride ($SnOHCl$, $Sn(OH)_2Cl_2$), a tin alkoxide or the like. These catalysts may be added directly during mixing, or they may be dissolved in a solvent such as methanol for addition. Because the catalytic effect cannot be achieved when the amount is too large or too small, it is preferably added in the range of from 1/10 to 1/10000, and more preferably from 1/100 to 1/2000, as a molar ratio with respect to the trifunctional organosilane.

The isocyanate compound used for the present invention is added for the purpose of increasing adhesion between the substrate and the inorganic oxide vapor deposition layer by the urethane bond which results from reaction with the acryl polyol, and it functions primarily as a crosslinking or hardening agent. Isocyanate compounds which can be used to achieve this object include monomers such as an aromatic monomer, aliphatic monomer such as tolylene diisocyanate (TDI), diphenylmethane diisocyanate (MDI), xylene diisocyanate (XDI), hexamethylene diisocyanate (HMDI) and isophorone diisocyanate (IPDI), as well as their polymers and derivatives. They may be used alone or in combinations.

The mixing ratio of the acryl polyol and the isocyanate compound is not particularly restricted, but if the isocyanate compound is deficient the hardening may not be satisfactory, and if it is excessive, blocking may occur creating problems for working. The mixing ratio of the acryl polyol and the isocyanate compound is therefore preferred to be such that the number of isocyanate groups of the isocyanate compound is no greater than 50 times the number of hydroxyl groups of the acryl polyol. It is more preferable for the isocyanate groups and hydroxyl groups to be at an equivalent ratio. The mixing method may be any publicly known one and is not particularly restricted.

For enhanced solution stability when preparing the solution of the composition, a metal alkoxide or its hydrolysate may be added. The metal alkoxide is a compound represented by the general formula $M(OR)_n$ wherein M is a metal such as Si, Al, Ti or Zr and R is an alkyl group such as $CH_3$ or $C_2H_5$. Specifically there may be mentioned tetraethoxysilane [$Si(OC_2H_5)_4$] and tripropoxyaluminum [$Al(OC_3H_7)_3$]. Among these are preferred tetraethoxysilane, tripropoxy-aluminum and mixtures thereof, because of their relative stability in aqueous solvents. The method used to obtain a hydrolysate of the metal alkoxide may involve hydrolysis with the aforementioned trifunctional organosilane, or the metal alkoxide hydrolysate may be added separately.

The mixing ratio of the trifunctional organosilane and the metal alkoxide is preferably in the range of a molar ratio of 10:1 to 1:10 from the viewpoint of solution stability. It is more preferred for these to be combined at an equimolar ratio.

There are no particular restrictions on the coated film of this composition, and for example, a solution prepared by any of the following methods may be coated onto the substrate.

1) A solution prepared by mixing the acryl polyol and isocyanate compound with the product of prior hydrolysis reaction of the trifunctional organosilane (where the aforementioned reaction catalyst may be used);

2) A solution prepared by mixing the acryl polyol and isocyanate compound with the trifunctional organosilane which has undergone hydrolysis reaction with a metal alkoxide (where the aforementioned reaction catalyst may be used);

3) A solution prepared by first mixing the trifunctional organosilane and the acryl polyol in a solvent (where the aforementioned reaction catalyst and metal alkoxide may also be added), subjecting the mixture to hydrolysis reaction, and then adding the isocyanate compound to the product thereof;

4) A solution prepared by adding the isocyanate compound to a simple mixture of the trifunctional organosilane and the acryl polyol (where the aforementioned reaction catalyst and metal alkoxide may also be added).

Various additives, for example, hardening accelerators such as tertiary amines, imidazole derivatives, carboxylic acid metal salt compounds, quaternary ammonium salts, and quaternary phosphonium salts, antioxidants such as phenol-based antioxidants, sulfur-based antioxidants and phosphite-based antioxidants, leveling agents, flow adjustors, catalysts, crosslinking reaction accelerators, fillers and the like may also be included depending on the need.

The solvent or dilution solvent in the solution used to form the primer layer is not particularly restricted so long as it is capable of dissolving or diluting each of the components forming the primer layer. For example, when a trifunctional organosilane is used, an ester such as ethyl acetate or butyl acetate is appropriate, and when a trifunctional organosilane hydrolysate is used, a mixed solvent of an ester with an alcohol such as methanol, ethanol or isopropyl alcohol is appropriate. In addition to these solvents, ketones such as methyl ethyl ketone and aromatic hydrocarbons such as toluene and xylene may also be used alone or in any desired combination. In particular, since aqueous solutions of hydrochloric acid and the like are sometimes used for hydrolysis of trifunctional organosilanes, it is important to use a mixed solvent of the polar solvent such as ethyl acetate in admixture with isopropyl alcohol or the like as a co-solvent.

The thickness of the primer layer is not particularly restricted as long as a uniform coated film is formed. However, the dry film thickness (solid portion) is generally preferred to be in the range of 0.01~2 μm. If the thickness is less than 0.01 μm it becomes difficult to obtain a uniform coated film, and the adhesion will sometimes be reduced. If the thickness exceeds 2 μm, it becomes impossible to maintain flexibility of the coated film because of its thickness, while the risk of cracking of the coated film due to external factors also becomes a concern. A particularly preferred range for the thickness of the primer layer is from 0.05~0.5 µm.

The method used to form the primer layer may be, for example, a well known printing process such as offset printing, gravure printing, silk screen printing, etc. or a well known application process such as roll coating, knife edge coating, gravure coating, etc. The drying conditions may be such conditions as are commonly employed.

The inorganic oxide vapor deposition layer is a vapor deposition layer of an inorganic oxide comprising aluminum oxide, silicon oxide, tin oxide, magnesium oxide or a mixture thereof. The layer should be transparent and have gas barrier properties against oxygen, water vapor, etc. Particularly preferred among these are aluminum oxide and silicon oxide. However, the vapor deposition layer of the present invention is not limited to the above-mentioned inorganic oxides, and any other material may be used which meets the aforementioned requirements.

The optimum thickness of the vapor deposition layer will depend on the type and structure of the inorganic oxide used, but it is generally preferred to be appropriately selected within a range of 5~300 nm. If the film thickness is less than 5 nm it may not be possible to obtain a uniform film and the film thickness may be inadequate, which may prevent it from adequately carrying out its function as a gas barrier material. If the film thickness is over 300 nm, it becomes impossible to maintain flexibility of the thin-film, presenting the risk of cracking of the thin-film due to external factors such as bending and stretching after formation of the film. A preferred range for the thickness of the vapor deposition layer is from 10 to 150 nm.

Many different methods exist for formation of the inorganic oxide vapor deposition layer on the primer layer, and common vacuum vapor deposition may be employed. Other thin-film forming methods, such as sputtering, ion plating and plasma vapor phase growth methods (CVD) may also be used. From the standpoint of productivity, however, vacuum vapor deposition is a superior method at the current time. The heating means used for vacuum vapor deposition is preferably an electron beam heating system, resistance heating system or induction heating system. For better adhesion between the vapor deposition layer and the substrate and greater density of the vapor deposition layer, the vapor deposition may be accomplished by the plasma assist method or ion beam assist method. For higher transparency of the vapor deposition film, the vapor deposition reaction may be carried out while blowing in oxygen gas or the like.

An overcoating layer is optionally formed on the inorganic oxide vapor deposition layer in order to provide higher gas barrier properties depending on the quality demanded.

The overcoating layer is formed using a coating agent composed mainly of an aqueous solution or aqueous/alcohol mixed solution which contains an water-soluble polymer and either or both (a) at least one metal alkoxide or hydrolysate thereof and (b) tin chloride. This may be, for example, a solution prepared by dissolving the water-soluble polymer and tin chloride in an aqueous (water or water/alcohol mixture) solvent, or such a solution modified by mixture with a metal alkoxide directly or after its hydrolysis or other treatment. After coating of the solution onto the inorganic oxide vapor deposition layer, it is heated and dried to form the layer. The various components included in the coating agent will now be described in further detail.

As water-soluble polymers to be used in the coating agent according to the present invention there may be mentioned polyvinyl alcohol, polyvinylpyrrolidone, starch, methyl cellulose, carboxymethyl cellulose, sodium alginate, etc. Polyvinyl alcohol (hereunder, simply called as PVA) in particular has the most excellent gas barrier property when used in the coating agent of the present invention. PVA is generally obtained by saponification of polyvinyl acetate. The PVA is not particularly restricted and includes, for example, partially saponified PVA wherein 10%, 20% or more of the acetate groups remain, or total PVA wherein only a few percent of the acetate groups remain.

The tin chloride used in the coating agent may be stannous chloride ($SnCl_2$), stannic chloride ($SnCl_4$) or a mixture thereof. These tin chloride compounds may be anhydrates or hydrates.

The metal alkoxide is a compound represented by the general formula $M(OR)_n$ wherein M is a metal such as Si, Ti, Al or Zr and R is an alkyl group such as $CH_3$ or $C_2H_5$. Specifically there may be mentioned tetraethoxysilane [$Si(OC_2H_7)_4$] and triisopropoxyaluminum [$Al(O\text{-}2'\text{-}C_3H_5)_3$], tetraethoxysilane and triisopropoxyaluminum being preferred because of their relative stability in aqueous solvents after hydrolysis.

If necessary, a publicly known additive such as an isocyanate compound or silane coupling agent or a dispersing agent, stabilizer, viscosity adjustor, coloring agent or the like, may be added to an extent which does not impair the gas barrier properties of the coating agent.

Preferred examples of isocyanate compounds which may be added to the coating agent include ones having two or more isocyanate groups in the molecule. For example, there may be mentioned tolylene diisocyanate, triphenylmethane triisocyanate, tetramethylxylene diisocyanate and other such monomers, as well as their polymers and derivatives.

The method for applying the coating agent may employ a publicly known means for commonly used dipping methods, roll coating methods, screen printing methods, spray methods and the like. The thickness of the coated film will differ depending on the type of coating agent and the working conditions; the post-drying thickness may be 0.01 µm or greater, but if the thickness exceeds 50 µm cracks will tend to occur in the film, and therefore the range of 0.01~50 µm is preferred.

Other layers may also be laminated over the inorganic oxide vapor deposition layer or the overcoating layer. Examples thereof include printed layers, interlayer films, heat seal layers, etc.

A printed layer is formed for practical application as a packaging bag or the like. It is, for example, a layer composed of an ink prepared by adding an additive such as any of various pigments, extender pigments, plasticizers, desiccators, stabilizers and the like, to a conventionally employed ink binder resin which is urethane-based, acrylic-based, nitrocellulose-based, rubber-based, vinyl chloride-based, etc. The printing forms characters, images and the like. The forming process may be a well known printing process such as offset printing, gravure printing or silk screen printing, or a well known application process such as roll coating, knife edge coating or gravure coating. The dry film thickness (solid portion) of the printed layer may be from 0.1 to 2.0 µm.

An interlayer film is formed between the vapor deposition layer or overcoating layer and the heat seal layer in order to increase the rupture strength during boiling or retort sterilization, and from the standpoint of mechanical strength and thermal stability, generally it must be of a type selected from among biaxially stretched nylon films, biaxially stretched polyethylene terephthalate films and biaxially stretched polypropylene films. Its thickness will be determined based on the material and the demanded quality, but it is generally in the range of 10~30 μm. The method of lamination may be a publicly known one such as dry lamination involving attachment using an adhesive agent such as a two-part curing type urethane-based resin.

A heat seal layer is provided as an adhesive layer when forming bag-like packages. Examples of resins which may be used or the heat seal layer include polyethylene, polypropylene, ethylene-vinyl acetate copolymer, ethylene-methacrylic acid copolymer, ethylene-methacrylic acid ester copolymer, ethylene-acrylic acid copolymer, ethylene-acrylic acid ester copolymer, and metal crosslinked forms thereof. The thickness will be determined based on the purpose, but it is generally in the range of 15~200 μm. The method of lamination will generally be a method such as dry lamination involving attachment of a film of the resin using an adhesive agent such as a two-part curing type urethane-based resin, but other publicly known methods may be used for the lamination.

A packaging material employing a vapor deposition film according to the present invention can be used as a packaging material in the field of foods, non-foods and medicines. In particular, when it is used as a packaging material for boiling sterilization, retort sterilization or autoclave sterilization, it gives a packaging material with excellent transparency and gas barrier properties while also avoiding the problem of peeling, etc.

Any form of packaging is possible as a packaging employing the packaging material of the invention, and as examples there may be mentioned three-side sealed pouches, four-side sealed pouches, standing type pouches, pillow type pouches and the like. The packaging may also be in a form with a cover sealing the opening of an open container. A publicly known method may be used as the shaping method.

Figure 3:
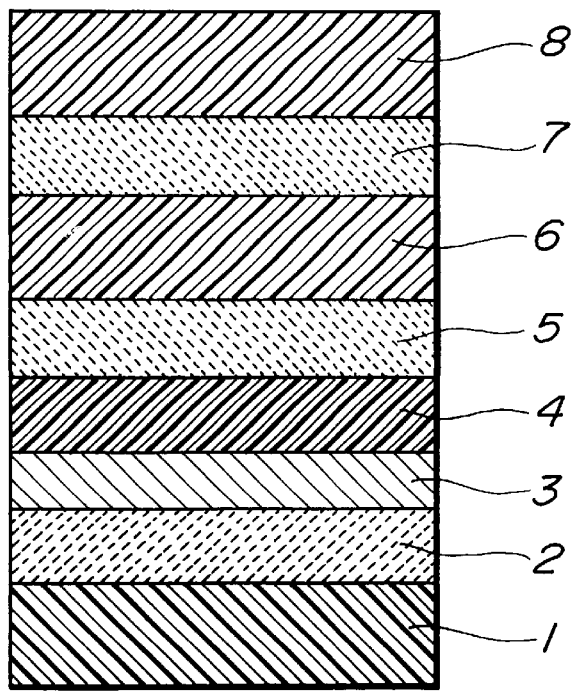
FIG. 3 is a partial cross-sectional view of a packaging material prepared using a vapor deposition film according to yet another embodiment of the present invention.
Figure 4:
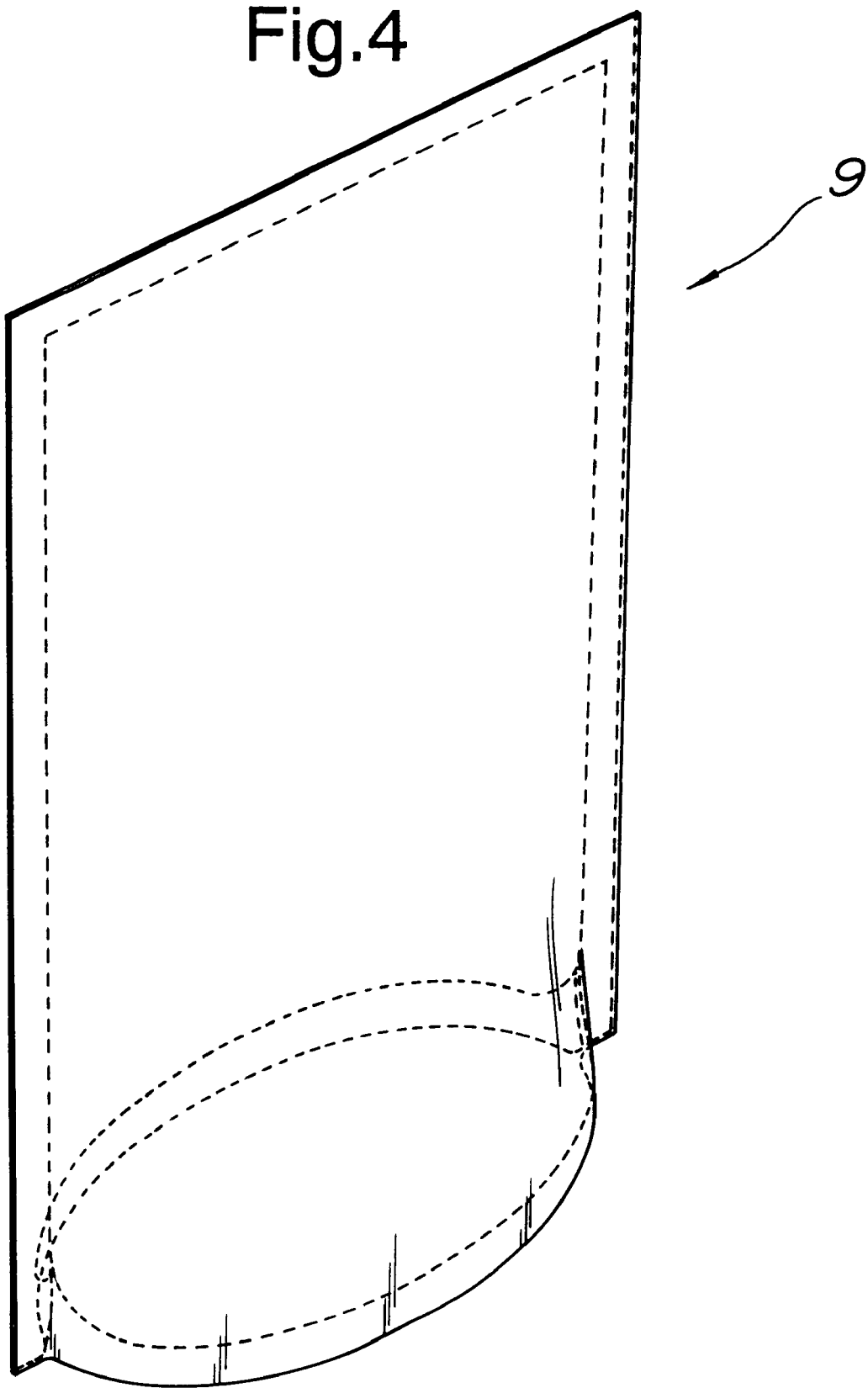
FIG. 4 is a perspective view of an embodiment of a package made using the packaging material shown in FIG. 3.

FIG. 3 is a cross-sectional view of the layer structure of a packaging material according to an embodiment of the invention. In this drawing, reference numeral 1 denotes a substrate, 2 a primer layer, 3 a vapor deposition layer, 4 an overcoating layer, 5 an adhesive layer, 6 an interlayer film, 7 another adhesive layer and 8 a heat seal layer. The heat seal layers of packaging materials constructed in this fashion are attached together and heat sealed, to form a standing type pouch such as shown in FIG. 4, for example.

EXAMPLES

A packaging material employing the vapor deposition film of the present invention will now be further explained with reference to concrete examples, with the understanding that the invention is not limited to these examples so long as the gist thereof is maintained.

(Preparation of Primer Layer Solution)

A) In a diluting solvent (ethyl acetate) 2-(epoxycyclohexyl)ethyl trimethylsilane (hereunder, simply called as EETMS) and acryl polyol at a 5.0-fold amount (weight ratio) with respect to the EETMS were mixed. A tin chloride ($SnCl_2$)/methanol solution (prepared to 0.003 mol/g) was further added to the mixture as a catalyst to 1/135 mol with respect to the EETMS, and the mixture was stirred. Tolylene diisocyanate (hereunder, simply called as TDI) was then added at an equivalent of isocyanate groups in the TDI with respect to hydroxyl groups in the acryl polyol. The mixed solution was diluted to 2% by weight as a total concentration of the added components to make solution A.

B) In a diluting solvent (isopropyl alcohol/ethyl acetate) EETMS and tetraethoxysilane ($Si(OC_2H_5)_4$: hereunder, simply called as TEOS) were mixed at a molar ratio of 1:1. To this mixture there were added acryl polyol at a 2.5-fold amount in terms of weight and a tin chloride ($SnCl_2$)/methanol solution (prepared to 0.003 mol/g) as a catalyst at an amount of 1/400 mol with respect to the mixture, and the mixture was stirred. Next, 0.1 N hydrochloric acid was added and stirred therewith for hydrolysis. TDI was then added at an equivalent of isocyanate groups in the TDI with respect to hydroxyl groups in the acryl polyol. The mixed solution was diluted to 2% by weight as a total concentration of the added components to make solution B.

C) In a diluting solvent (isopropyl alcohol/ethyl acetate) EETMS and TEOS were mixed at a molar ratio of 1:1. To this mixture there was added acryl polyol at a 2.5-fold amount in terms of weight. TDI was then added at an equivalent of isocyanate groups in the TDI with respect to hydroxyl groups in the acryl polyol. The mixed solution was diluted to 2% by weight as a total concentration of the added components to make solution C.

D) In a diluting solvent (ethyl acetate), TDI was added as an isocyanate compound to acryl polyol at an equivalent of isocyanate groups in the TDI with respect to hydroxyl groups in the acryl polyol. The mixed solution was diluted to 2% by weight as a total concentration of the added components to make solution D.

E) In a diluting solvent (ethyl acetate), 5 parts by weight of acryl polyol was mixed with 1 part by weight of γ-isocyanate propyltrimethoxysilane, and the mixture was stirred. TDI was then added as an isocyanate compound at an equivalent of isocyanate groups in the TDI with respect to hydroxyl groups in the acryl polyol. The mixed solution was diluted to 2% by weight as a total concentration of the added components to make solution E.

F) In a diluting solvent (ethyl acetate), 5 parts by weight of acryl polyol was mixed with 1 part by weight of γ-isocyanate propyltrimethoxysilane, and the mixture was stirred. XDI was then added as an isocyanate compound at an equivalent of isocyanate groups with respect to hydroxyl groups in the acryl polyol. The mixed solution was diluted to 2% by weight as a total concentration of the added components to make solution F.

G) In a diluting solvent (ethyl acetate), 5 parts by weight of acryl polyol was mixed with 1 part by weight of -isocyanate propyltrimethoxysilane, and the mixture was stirred. A 7:3 mixture of XDI and IPDI as isocyanate compounds was then added at an equivalent of isocyanate groups in the isocyanate compound mixture with respect to hydroxyl groups in the acryl polyol. The mixed solution was diluted to 2% by weight as a total concentration of the added components to make solution G.

Example 1

On one side of a 12-μm thick biaxially stretched polyethylene terephthalate (PET) film as the substrate 1, the solution A was coated and dried by gravure coating to a dry film thickness of 0.2 μm, to form a primer layer 2. An electron beam heating-type vacuum vapor deposition apparatus was then used for vaporization of metallic aluminum, and oxygen gas was introduced therein to form an aluminum oxide vapor deposition layer 3 to a thickness of 20 nm on the primer layer 2. A coating agent with the composition described below was further coated thereon by gravure coating. After coating, it was dried at 120° C. for one minute to form a 0.3-μm thick overcoating layer 4, thus yielding a vapor deposition film. Composition of coating agent: Mixture of solution (1) and solution (2) below at a mixing ratio (wt %/wt %) of 60/40.

Solution (1): Hydrolyzed solution with solid portion of 3 wt % (as $SiO_2$) prepared by adding 89.6 g of hydrochloric acid (0.1 N) to 10.4 g of tetraethoxysilane and stirring for 30 minutes for hydrolysis.

Solution (2): Water/isopropyl alcohol solution (water:isopropyl alcohol weight ratio=90:10) containing 3 wt % polyvinyl alcohol.

The overcoating layer 4 of the resulting vapor deposition film was laminated with a biaxially stretched nylon film with a thickness of 15 μm as an interlayer film 6 by dry lamination, via a two-part curing type urethane-based adhesive, and then a 70-μm thick polypropylene film was laminated as a heat seal layer 8 by dry lamination via a two-part curing type urethane-based adhesive, to fabricate a packaging material.

Example 2

A packaging material was obtained in the same manner as Example 1, except that the vapor deposition layer 3 in Example 1 consisted of silicon oxide at a thickness of about 40 nm obtained by vacuum vapor deposition with a resistance heating system.

Example 3

A packaging material was obtained in the same manner as Example 1, except that the solution B was used as the primer layer 2 in Example 1.

Example 4

A packaging material was obtained in the same manner as Example 1, except that the solution C was used as the primer layer 2 in Example 1.

Example 5

A packaging material was obtained in the same manner as Example 1, except that the solution E was used as the primer layer 2 in Example 1.

Example 6

A packaging material was obtained in the same manner as Example 1, except that the solution F was used as the primer layer 2 in Example 1.

Example 7

A packaging material was obtained in the same manner as Example 1, except that the solution G was used as the primer layer 2 in Example 1.

Comparative Example 1

A packaging material was obtained in the same manner as Example 1, except that the primer layer 2 in Example 1 was not formed.

Comparative Example 2

A packaging material was obtained in the same manner as Example 1, except that the solution D was used as the primer layer in Example 1.

(Test 1)

The packaging materials of the present invention according to Examples 1–7 and the packaging materials according to Comparative Examples 1–2 which were fabricated in the manner described above were used to make pouches with the 4 sides as the sealing portions, and each was filled with 150 g of water as the contents. Retort sterilization was then carried out at 121° C. for 30 minutes. The evaluation was based on the oxygen permeability before and after the retort sterilization (using an oxygen permeation measuring apparatus (OXTRAN-10/50A by Modern Control Co.) for measurement in an atmosphere of 30° C., 70%RH, units: $cc/m^2/day$), the laminate strength (measured by peel rate at 300 mm/min, units: gr/15 mm) and the visually observed state of peeling between the substrate and the vapor deposition layer after retort sterilization. The state of peeling was determined by observing the peeling of the vapor deposition layer upon 180-degree bending of the pouch seal sections after retort sterilization. The results are listed in Table 1.

The symbols used in Table 1 to indicate the evaluation results for the appearance of peeling after retort sterilization are as follows.

◎: No peeling

×: Peeling

The symbols used in Table 1 for the overall evaluation results are as follows.

◎: Good

×: Unusable

TABLE 1

| | Oxygen permeability | | Laminate strength | | Appearance | |
|---|---|---|---|---|---|---|
| | Before retort sterilization | After retort sterilization | Before retort sterilization | After retort sterilization | after retort sterilization | Overall evaluation |
| Example 1 | 0.34 | 0.52 | 580 | 580 | ◎ | ◎ |
| Example 2 | 0.41 | 0.43 | 570 | 510 | ◎ | ◎ |
| Example 3 | 0.38 | 0.47 | 450 | 420 | ◎ | ◎ |
| Example 4 | 0.51 | 0.48 | 500 | 450 | ◎ | ◎ |
| Example 5 | 0.69 | 0.80 | 590 | 330 | ◎ | ◎ |
| Example 6 | 0.63 | 0.77 | 540 | 340 | ◎ | ◎ |
| Example 7 | 0.72 | 0.81 | 630 | 350 | ◎ | ◎ |
| Comp. Ex. 1 | 0.34 | 1.08 | 460 | 100 | × | × |
| Comp. Ex. 2 | 0.42 | 0.74 | 540 | 300 | × | × |

Table 1 shows that the vapor deposition films of the present invention according to Examples 1–7 and the packaging materials employing them have sufficient transparency to allow direct viewing of their contents. The examples of the present invention have high gas barrier properties to block gases which can affect the contents, as well as high laminate strength. Even after retort sterilization there is no deterioration of the gas barrier properties, and the high laminate strength is maintained. They clearly exhibit excellent retort sterilization resistance with no peeling of their vapor deposition layers.

In comparison, the packaging materials of Comparative Examples 1 and 2 also have sufficient transparency to allow direct viewing of the contents, and prior to retort sterilization they had high gas barrier properties to block gases which can affect the contents, as well as high laminate strength. After retort sterilization, however, it is seen that the gas barrier properties of the packages deteriorated, the laminate strength was lowered, peeling occurred, and the retort sterilization resistance was poor.

Example 8

On one side of a 12-$\mu$m thick biaxially stretched polyethylene terephthalate (PET) film as the substrate 1, the solution E was coated by gravure coating and dried to a dry film thickness of 0.2 $\mu$m, to form a primer layer 2. An electron beam heating-type vacuum vapor deposition apparatus was then used for vaporization of metallic aluminum, and oxygen gas was introduced therein to form an aluminum oxide vapor deposition layer 3 to a thickness of 20 nm on the primer layer 2.

A 30-$\mu$m thick polypropylene film was laminated as a heat seal layer on the resulting vapor deposition layer 3 by dry lamination via a two-part curing type urethane-based adhesive, to fabricate a packaging material.

Comparative Example 3

A packaging material was obtained in the same manner as Example 8, except that the primer layer 2 in Example 8 was not formed.

(Test 2)

The packaging material of the present invention according to Example 8 and the packaging material according to Comparative Example 3 which were fabricated in the manner described above were used for measurement of the laminate strength between the vapor deposition layer and the heat seal layer (measured at a peel rate of 300 mm/min, units: gr/15 mm). The laminate strength was also measured in a similar manner while running a small amount of tap water over the peeling surface between the vapor deposition layer and the heat seal layer. The results are listed in Table 2.

TABLE 2

| | Laminate strength | |
|---|---|---|
| | Without running water | With running water |
| Example 8 | 640 | 540 |
| Comp. Ex .3 | 660 | 50 |

As is clear from the explanation given above, vapor deposition films according to the present invention and packaging materials employing them have a construction wherein formation of a primer layer with excellent dimensional stability and adhesion even after boiling sterilization or retort sterilization on a transparent plastic substrate is followed by lamination of a vapor deposition layer made of an inorganic oxide with excellent gas barrier properties. They therefore have transparency which allows their contents to be directly viewed, as well as high gas barrier properties comparable to those of aluminum foil. In addition, there is no peeling or loss of gas barrier properties of the vapor deposition layer even after boiling sterilization or retort sterilization. Thus, they have a wide range of possible uses in the field of packaging, as packaging materials for common foods, non-foods, medicines and the like.

While the presently preferred embodiments of the present invention have been shown and described, it will be understood that the present invention is not limited thereto, and that various changes and modifications may be made by those skilled in the art without departing from the scope of the invention as set forth in the appended claims.

What is claimed is:

1. A vapor deposition film comprising:
   a substrate made of a plastic material,
   a primer layer comprising:
      a trifunctional organosilane represented by the general formula R'Si(OR)$_3$ wherein R' is a substituted or unsubstituted alkyl group or a vinyl group, and R is an alkyl group,
      an acryl polyol, and
      an isocyanate compound, and
   a vapor deposition layer comprising an inorganic oxide formed to a thickness of 5~300 nm, the primer layer and the vapor deposition layer being formed by successive lamination on at least one side of said substrate.

2. A vapor deposition film according to claim 1, wherein R' in the structure of said trifunctional organosilane is an alkyl group including an epoxy group.

3. A vapor deposition film according to claim 1, wherein a reaction catalyst is added to said composition.

4. A vapor deposition film according to claim 3, wherein said reaction catalyst is a tin compound.

5. A vapor deposition film according to claim 4, wherein said tin compound is a tin compound selected from the group consisting of tin chloride, tin oxychloride and tin alkoxides.

6. A vapor deposition film according to claim 1, wherein R' in the structure of said trifunctional organosilane is an alkyl group including an isocyanate group.

7. A vapor deposition film according to claim 1, wherein a metal alkoxide represented by the general formula M(OR)$_n$ (wherein M is a metal element, R is an alkyl group such as $CH_3$, $C_2H_5$, etc. and n is the oxidation number of the metal element) or a hydrolysate of said metal alkoxide is further added to said composition.

8. A vapor deposition film according to claim 7, wherein the metal of said metal alkoxide is a metal selected from the group consisting of Si, Al, Ti, Zr and their mixtures.

9. A vapor deposition film comprising:
   a substrate made of a plastic material,
   a primer layer comprising:
      a hydrolysate of a trifunctional organosilane represented by the general formula R'Si(OR)$_3$ wherein R' is a substituted or unsubstituted alkyl group or a vinyl group, and R is an alkyl group,
      an acryl polyol and an isocyanate compound, and
   a vapor deposition layer comprising an inorganic oxide formed to a thickness of 5~300 nm, the primer layer and the vapor deposition layer being formed by successive lamination on at least one side of said substrate.

10. A vapor deposition film according to claim 9, wherein R' in the structure of said trifunctional organosilane is an alkyl group including an epoxy group.

11. A vapor deposition film according to claim 9, wherein a reaction catalyst is added to said composition.

12. A vapor deposition film according to claim 11, wherein said reaction catalyst is a tin compound.

13. A vapor deposition film according to claim 12, wherein said tin compound is a tin compound selected from the group consisting of tin chloride, tin oxychloride and tin alkoxides.

14. A vapor deposition film according to claim 9, wherein a metal alkoxide represented by the general formula M(OR)$_n$ (where M is a metal element, R is an alkyl group such as $CH_3$, $C_2H_5$, etc. and n is the oxidation number of the metal element) or a hydrolysate of said metal alkoxide is further added to said composition.

15. A vapor deposition film according to claim 14, wherein the metal of said metal alkoxide is a metal selected from the group consisting of Si, Al, Ti, Zr and their mixtures.

16. A vapor deposition film according to claim 1, wherein the thickness of said primer layer is in the range of 0.01~2 μm.

17. A vapor deposition film according to claim 1, wherein said inorganic oxide is one selected from the group consisting of aluminum oxide, silicon oxide, magnesium oxide and their mixtures.

18. A vapor deposition film according to claim 1, wherein an overcoating layer is additionally laminated on said vapor deposition film, said overcoating layer being a layer obtained by applying, heating and drying a coating agent composed mainly of an aqueous solution or an aqueous/alcohol mixed solution containing a water-soluble polymer and either or both (a) at least one metal alkoxide or hydrolysate thereof and (b) tin chloride.

19. A vapor deposition film according to claim 18, wherein said metal alkoxide is one selected from the group consisting of tetraethoxysilane, triisopropoxyaluminum and mixtures thereof.

20. A vapor deposition film according to claim 1, wherein said water-soluble polymer is polyvinyl alcohol.

21. A packaging material comprising a vapor deposition film according to claim 1, and a heat seal layer laminated on the vapor deposition layer or overcoating layer side thereof.

22. A package formed into a bag using a packaging material according to claim 21.

23. A vapor deposition film according to claim 19, wherein said water-soluble polymer is polyvinyl alcohol.

24. A vapor deposition film according to claim 1, wherein a number of isocyanate groups in the trifunctional organosilane is no greater than 50 times the number of hydroxyl groups of the acryl polyol.

25. A vapor deposition film according to claim 9, wherein a number of isocyanate groups in the trifunctional organosilane is no greater than 50 times the number of hydroxyl groups of the acryl polyol.

26. A vapor deposition film according to claim 7, wherein a molar ratio of the trifunctional organosilane to the metal alkoxide is in the range of 10:1 to 1:10.

27. A vapor deposition film according to claim 14, wherein a molar ratio of the trifunctional organosilane to the metal alkoxide is in the range of 10:1 to 1:10.

28. A vapor deposition film according to claim 7, wherein a molar ratio of the trifunctional organosilane to the metal alkoxide is in the range of an equimolar ratio.

29. A vapor deposition film according to claim 14, wherein a molar ratio of the trifunctional organosilane to the metal alkoxide is in the range of an equimolar ratio.

\* \* \* \* \*